US005785486A

United States Patent [19]

McNeilus et al.

[11] Patent Number: 5,785,486

[45] Date of Patent: Jul. 28, 1998

[54] REPLACEABLE WEAR SYSTEM

[75] Inventors: Garwin B. McNeilus, Dodge Center; Wilbur R. Harris, Rochester; Francis Oliver, Kasson, all of Minn.

[73] Assignee: McNeilus Truck and Manufacturing, Inc., Dodge Center, Minn.

[21] Appl. No.: 790,004

[22] Filed: Jan. 28, 1997

Related U.S. Application Data

[63] Continuation-in-part of Ser. No. 717,485, Sep. 20, 1996, abandoned.

[51] Int. Cl.$^6$ .......... B60P 1/32

[52] U.S. Cl. .......... 414/513; 100/245; 414/525.6

[58] Field of Search .......... 414/509–517, 414/525.2, 525.6; 100/245, 188 R; 198/747, 749

[56] References Cited

U.S. PATENT DOCUMENTS

| | | | |
|---|---|---|---|
| 1,981,992 | 11/1934 | Curtis | 384/41 |
| 2,179,726 | 11/1939 | Lewis et al. | 414/513 |
| 2,630,928 | 3/1953 | McCombs | 414/513 |
| 2,800,234 | 7/1957 | Herpich et al. | 414/513 |
| 2,888,300 | 5/1959 | Curtis et al. | 384/42 |
| 3,053,580 | 9/1962 | Bullard, III et al. | 384/41 |
| 3,247,984 | 4/1966 | Gregory, Sr. et al. | 414/513 |
| 3,486,646 | 12/1969 | O'Brien et al. | 414/513 |
| 3,802,552 | 4/1974 | Garr et al. | 198/747 X |
| 3,899,090 | 8/1975 | Telesio | 414/513 |
| 3,953,170 | 4/1976 | Webb | 414/517 |
| 4,565,125 | 1/1986 | Khan | 100/245 X |
| 4,627,783 | 12/1986 | De Filippi | 414/513 X |
| 4,632,628 | 12/1986 | Kress et al. | 414/513 |
| 4,877,366 | 10/1989 | De Filippi | 414/517 |
| 5,192,189 | 3/1993 | Murata et al. | 384/42 X |
| 5,560,713 | 10/1996 | Christenson | 414/513 X |

OTHER PUBLICATIONS

Nylatron® GSM Blue Nylon Machining Stock, ©1995 The Polymer Corporation Apr. 1995.

Engineering Plastic Products, ©1992 The Polymer Corporation 1 May 1994.

Plastic Bearing Design Manual, ©The Polymer Corporation SBTB-2 May 1992.

Monocast & Nylatton GSM Nylon, The Polymer Corporation 2.5M–Aug. 1991.

Sheave Design Manual for Nylatron® GSM Nylon, ©1993 The Polymer Corporation Jun. 1993.

Nylatron® Nylon Gear Design and Fabrication Manual, The Polymer Corporation May 1987—5M.

*Primary Examiner*—David A. Bucci
*Attorney, Agent, or Firm*—Haugen and Nikolai, P.A.

[57] ABSTRACT

A vehicle mounted reciprocating refuse packing or ejecting mechanism designed to operate along and carried by spaced parallel rails include a pair of spaced parallel bottom rails mounted in the vehicle body and a packer or ejection mechanism designed to be carried by the rails in the vehicle body. A pair of spaced wear shoes are located between the rails and the mechanism and a pair of inwardly directed shaped members mounted along the inner side walls of the vehicle body and above each side of the mechanism. The shaped members are parallel to the rails, each having wear surface at least partially directed downward. A pair of spaced upper wear pads associated with the mechanism, each wear pad having an upper surface matching an adjacent one of said upper wear surfaces are also provided.

21 Claims, 3 Drawing Sheets

REPLACEABLE WEAR SYSTEM

The present application is a Continuation-In-Part of application Ser. No. 08/717,485, filed Sep. 20, 1996 now abandoned, common of inventorship and assignee and to the extent not found in this application, materials from that application are hereby deemed incorporated by reference herein.

BACKGROUND OF THE INVENTION

I. Field of the Invention

The present invention is directed primarily to truck bodies, particularly task specific truck bodies dedicated to refuse collection that employ reciprocally operating packing and/or ejector systems, particularly those which are carried by a pair of spaced rails mounted within the truck body. The reciprocal action of the system results in high friction to surfaces in areas of contact between the packing and/or ejection mechanisms and the truck body. Specifically, the invention focuses on an improved wear system that includes long wearing, replaceable wear shoes and blocks or bars for use in conjunction with the operation of the packing and ejection mechanisms on such vehicles.

II. Related Art

Refuse hauling trucks commonly include a heavy duty chassis and a substantially hollow truck body mounted on the chassis and dedicated to receiving, compacting and discharging refuse materials. The truck body may include a single large continuous reservoir or several smaller separated reservoir compartments for processing different materials. The collection system includes all the related hydraulic, pneumatic and/or electric operating mechanisms associated with heavy duty packing and ejection collection equipment. Refuse trucks are of several basic types including those typically loaded from the rear, front or side. A single heavy duty hydraulic-operated compacting system is employed to compact refuse in the forward direction against an ejector blade in the case of rear loading trucks. In rear loading vehicles, the ejector blade conventionally forms the lower part of the front wall of the refuse reservoir and large hydraulic-operated packers push the refuse forward against the blade, with the blade retreating under pressure until the reservoir is fully packed. The rear loader discharges by fully raising the tailgate and operating the ejector blade rearward to, as in the case of the front loader, ejecting the entire contents from the rear of the open reservoir. Contemporary front or side loading trucks may have multiple-compartment charging hoppers which feed different separated materials into several separated refuse reservoir compartments. Each such charging hopper generally utilizes a separate compacting system to move materials from the charging hopper rearward into the adjacent reservoir.

Front loaders are designed to be loaded by dumping single or multi-compartment containers over the cab from the front of the vehicle into charging hopper having a like number of aligned compartments; compaction is rearward and discharge is from the rear of the vehicle. In the case of a single reservoir compartment, a single, cylinder-operated compaction/ejection mechanism moves aft along the horizontal plane in the manner of a plow blade to pack and compress the refuse in the refuse reservoir after such loading. Between loadings, the packer blade is moved forward in the charging hopper to allow more refuse to enter the reservoir behind the blade. In this manner, refuse is eventually packed up against a heavy duty tailgate until the refuse reservoir is full, at which point it must be emptied. The tailgate container discharge closer mechanism at the rear of the truck body reservoir is opened and the ejector blade is moved fully aft by full extension of the operating cylinder as cylinders to expel the entire contents of the refuse reservoir. Multiple compartment units typically utilize multiple packer/ejector systems, one handling each compartment, and any of the bodies may be tipable to utilize gravity or gravity-assisted discharge. A typical system is shown in application Ser. No. 08/480,902, filed on Jun. 8, 1995 and assigned to the same assignee as the present application, the contents of which are incorporated herein by reference for any purpose.

Side loaded vehicles are designed to be loaded by dumping containers just behind the cab from one or both sides of the vehicle. These vehicles may also carry loading mechanisms which can approach, seize and empty containers in range on the curb side of the vehicle as the vehicle stops in the roadway. These truck bodies may also have several compartments and typically such multiple-compartment versions contain front-to-back split charging hoppers adapted to receive different materials in different portions to supply separate reservoirs. These bodies may have a horizontal partition producing a split between upper and lower compartments charged by rear and forward separated charging hopper compartments, respectively. One such system is shown in application Ser. No. 08/596,731 filed Feb. 5, 1996 now abandoned, and assigned to the same assignee as the present application, the contents of which are incorporated herein by reference for any purpose. The truck bodies typically have a separate packing mechanism operating in each charging hopper compartment to charge an associated reservoir. These bodies are usually tippable for gravity discharge using a plurality of reservoir-specific cylinder operated tailgates.

It will be appreciated that all these types of refuse hauling trucks typically employ reciprocating packing or ejecting systems that repeatedly traverse fore and aft at least to a limited degree and in same models even cover a large portion of the length of a hollow refuse reservoir propelled using one or more hydraulic cylinder. These devices typically are supported by spaced parallel, side mounted ejector slide rails configured as hollow C-shapes having an open area between a top plate and a bottom supporting structure designed to accept elongated load bearing slider or wear bars attached to the packer or ejector mechanism as the case may be. The rails extend along the length of the path of travel of the packer or ejector involved. In this manner, the rails in conjunction with the load, the bearing slider or wear bars operate in the C-shaped side rails carry the ejector system just above the reservoir compartment floor. The load bearing wear bars attach to the packing or ejecting mechanism generally ride on the rails and so concentrate a relatively large force on a relatively small area and conventionally wear by friction at a relatively rapid rate. They are typically lubricated metal on metal friction systems which is shown in application Ser. No. 08/377,147, filed on Jan. 24, 1995, now U.S. Pat. No. 5,560,713 and assigned to the same assignee as the present application, the contents of which are incorporated herein by reference for any purpose.

In addition to the lower and outer surfaces of the wear bars on which the packer ejector mechanism typically rides, many packer systems, particularly those utilized in front and side loading truck bodies, tend to "ride up" to a certain extent as they advance pushing refuse of one kind or another rearward into an adjacent chamber, or the like, as the refuse tends to collect and compact at the bottom of the charging hopper between the rails and underneath the packing mechanism. This causes the packing mechanism to have a tendency to ride up over such refuse instead of pushing it along in front of it and necessitates the application of vertical stops or upper stop surfaces to prevent vertical motion of the packer during reciprocating compaction of refuse. These stops conventionally are the top surfaces of the open C-shaped rail channel extending in from the side wall over the upper edges of the packing mechanism and result in further wear surfaces between the packing mechanism wear bars.

Of course, it is expensive and undesirable to require the frequent replacement of wear pads or shoes as that involves expensive repairs on a system which is otherwise intact necessitated only because of the relatively rapid wear of certain areas of the wear pads. In addition, the open side rails tend to collect and accumulate refuse material that is difficult to remove.

A system that utilizes an improved rail system, together with wear pads that offer superior performance and which, when replacement is necessary, are easier to replace, offers great advantages which reduce maintenance cost and extend the life of packing and ejector systems of the class utilizing such devices.

Accordingly, it is a primary object of the invention to provide an improved rail and wear pad system for reciprocally operating packers and ejectors in all types of refuse vehicles.

A further object of the invention is to provide an improved rail and wear pad system for reciprocally operating packers and ejectors that enjoys a greatly increased wear life.

A still further object of the invention is to provide an improved rail and wear pad system for reciprocally operating packers and ejectors utilizing wear shoes and/or pads which are "floating", i.e., confined against, but not fixed, to the packer or ejector structure.

Still another object of the invention is to provide an improved rail system for reciprocally operating packers and ejectors which avoids being clogged or obstructed by the materials being packed or ejected.

A still further object of the invention is to provide an improved rail, wear shoe and pad system for reciprocally operating packers and ejectors in which the only requirement for removal and replacement involves removing corresponding retaining plate.

Other objects and advantages will become apparent to those skilled in the art upon further familiarization with the specification, drawings and appended claims contained herein.

SUMMARY OF THE INVENTION

The present invention deals with improvements in wear systems for linear operating or reciprocating packing and ejector systems of a class which ride on bottom rails and pack, eject or both pack and eject refuse materials. The system of the invention includes both an improved rail and support wear pad or support wear shoe combination, together with upper wear bars which both reduces the tendency of this system to clog with refuse and simplifies the replacement of wear parts. The wear system of the invention employs floating wear shoes or bottom pads that have recesses correspondingly matched to the upper surfaces of closed, spaced parallel bottom rails. The shoes are retained by removable stop plates which overlay a portion of the ends of the shoes and fasten only to the packer or ejector itself (assisted by gravity). Separate upper floating and similarly retained wear pads are included which contact inwardly directed upper side wall projecting surfaces to prevent vertical displacement or "ride-up" of the ejector with respect to items being moved.

It is further contemplated that in certain applications only the lower wear shoes may be needed or used and in other applications only the upper wear pads would be employed. In addition, the bottom rails and so the bottom wear shoes, may be any convenient shape.

The materials of construction of the wear shoes or wear pads are an important aspect of the invention inasmuch as lower surface friction, longer wearing and lighter weight materials are most desired. Of course, they preferrably are relatively inert to the materials processed. Accordingly, many high impact, abrasion resistant and self-lubricating polymer materials are advantageous. Such materials, not only offer greater wear resistance over conventional bronze or other metallic surfaces, they are lighter weight and can readily be cast polymerized into the exact shape required for the particular shoe or pad. Examples of these products include a series of modified polyamide, particularly nylon products sold, examples of which are under the trademark "Nylatron" (Polymer Corporation, Reading, Pa.). One such material known as GSM cast nylon can be directly polymerized from the monomer into the shape of the article desired producing either simple or complex shapes free of voids and in sizes larger than those possible with conventional extrusion. These nylons may also be modified by incorporation or impregnation with friction reducing oils and molybdenum disulfide ($MoS_2$) which improves mechanical thermal and bearing properties of type 6/6 nylon, for example.

Of course, other materials which have the requisite physical properties and lend themselves to manufacture in the desired shapes and sizes can also be used. Another example of such material is polyetheretherketone (PEEK). Modified, partially crystallized polyethylene terephthalate thermoplastic polyester, thermoplastic acetyls and other materials are contemplated. It will further be appreciated that the shoes and pads may be of shapes other than those illustrated and described in the detailed description, which is exemplary rather than limiting in any respect. Also, the wear surface may be applied to or over a diverse base material such as an inert filler or spacer material.

Additionally, different materials may be used for the wear shoes and the upper wear pads where, generally, wear is less severe. Metal pads may be used for the upper pads in some applications and for both the upper pads and lower shoes in others. These include conventional metal materials, such as bronze, brass and steel, for example, that may also be used for the wear surfaces.

BRIEF DESCRIPTION OF THE DRAWINGS

In the drawings wherein like numerals designate like parts throughout the same.

DETAILED DESCRIPTION

The present invention offers a simplified approach to solving a severe maintenance problem, namely, frictional wear of contacting surfaces associated with reciprocating packing and ejecting systems in refuse vehicles. The invention further offers a non-clogging alternative to the conventional side rail system by providing a system utilizing space parallel closed bottom rails. The use of preferred light weight, low friction, abrasion resistant, relatively chemically inert materials, together with the location of the wear surfaces in accordance with the invention enables the associated reciprocating packing or ejecting system to operate up to four times longer between wear pad or shoe changes and the simplicity of the "floating" containment of the wear pads or shoes greatly reduces the complexity of the change event itself. In this manner, the wear pad and shoe system of the invention employs a "floating" system in which the movement of the pads relative to the packer or ejector system is restricted, but the pads themselves are not attached to the structure and are only retained in place by stop plates which overlay the ends of the pads or shoes. Separate upper wear pads are provided to contact inwardly directed upper side wall projected surfaces to prevent vertical displacement of the packing or ejection mechanism as it contacts material to be packed or ejected. These upper wear pads are also held in place similarly by retaining plates and the opposed facing friction surface.

While the example detailed in this description is one of a system including both lower wear shoes and upper wear pads, it should be noted that other combinations are within the contemplated scope of the invention. Certain applications may employ bottom wear shoes or top wear pads only. Certain applications may employ wear surfaces of different materials for upper and lower wear surfaces.

Figure 1:
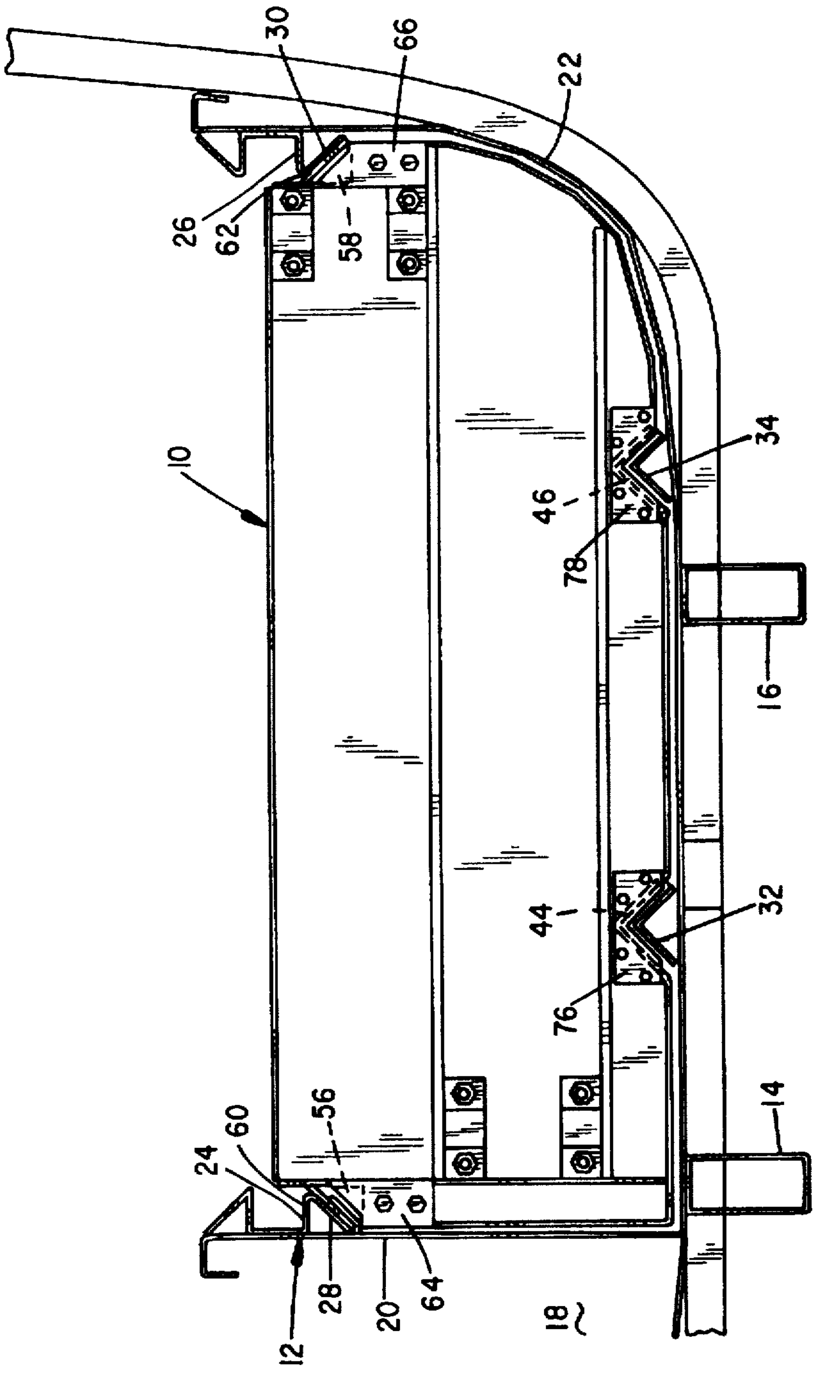
FIG. 1 is a rear elevational view of a packer panel taken from the front of a side loading truck body incorporating the wear system of the invention.

A representation system is further illustrated by the figures. In FIG. 1, a packing ram generally at 10 is shown nested in a charging hopper 12 which, in turn, is carried on a convention truck chassis frame including spaced main structural support members 14 and 16. The loading hopper illustrated is that of a side loading vehicle, noticeably recessed at 18 to accommodate a mechanized loading device which may be a bucket or arm-carried lift and dump device (not shown). Thus, the charging hopper includes one relatively vertical side wall 20 at the recess and one which might describe a curvilinear shape in accordance with the general shape of the truck body as at 22. Of course, any type hopper or body shape can be used with the insertion.

Figure 2:
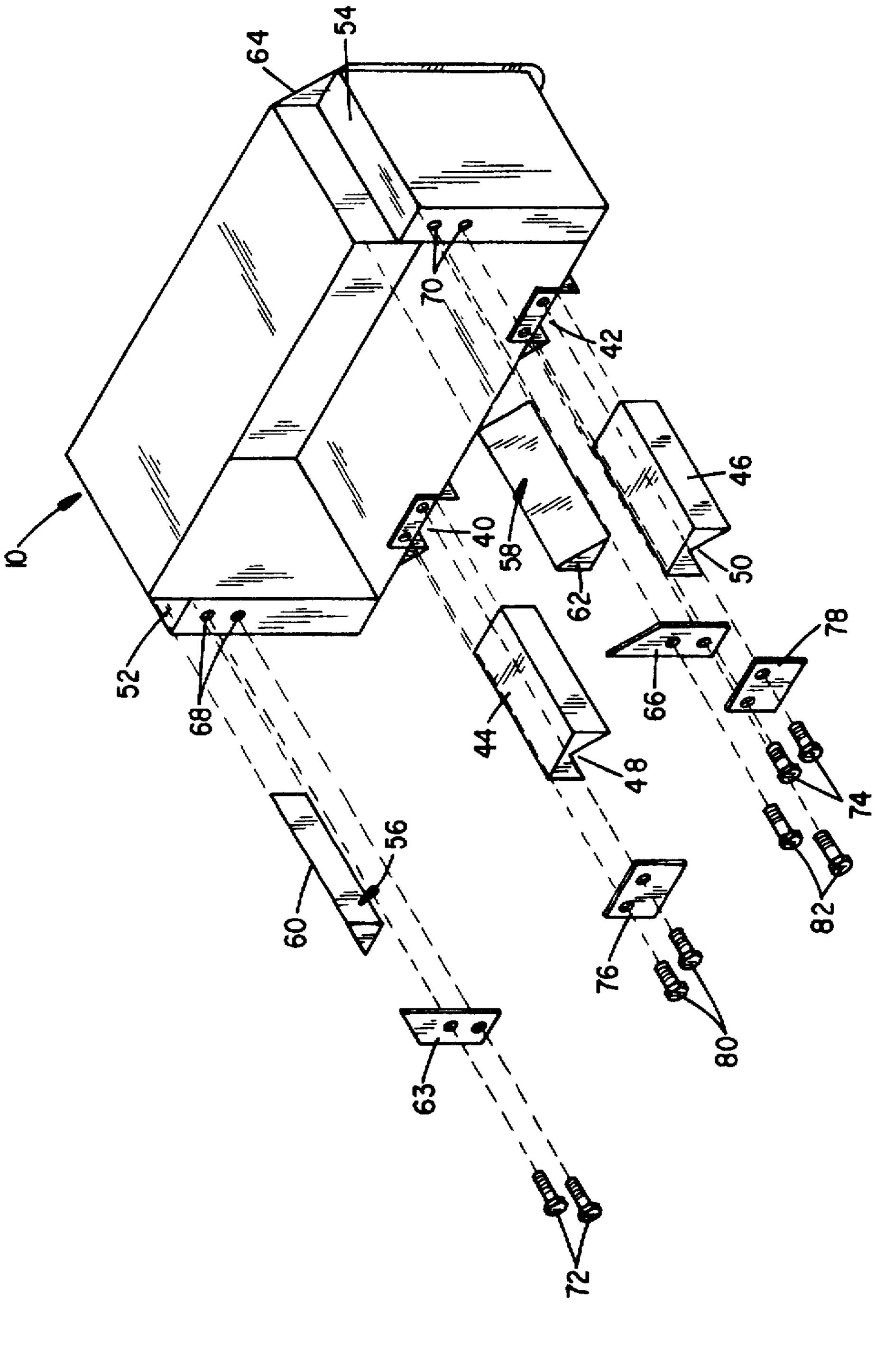
FIG. 2 is an exploded view illustrating the assembly of the wear system with regard to the packer panel of FIG. 1.
Figure 3:
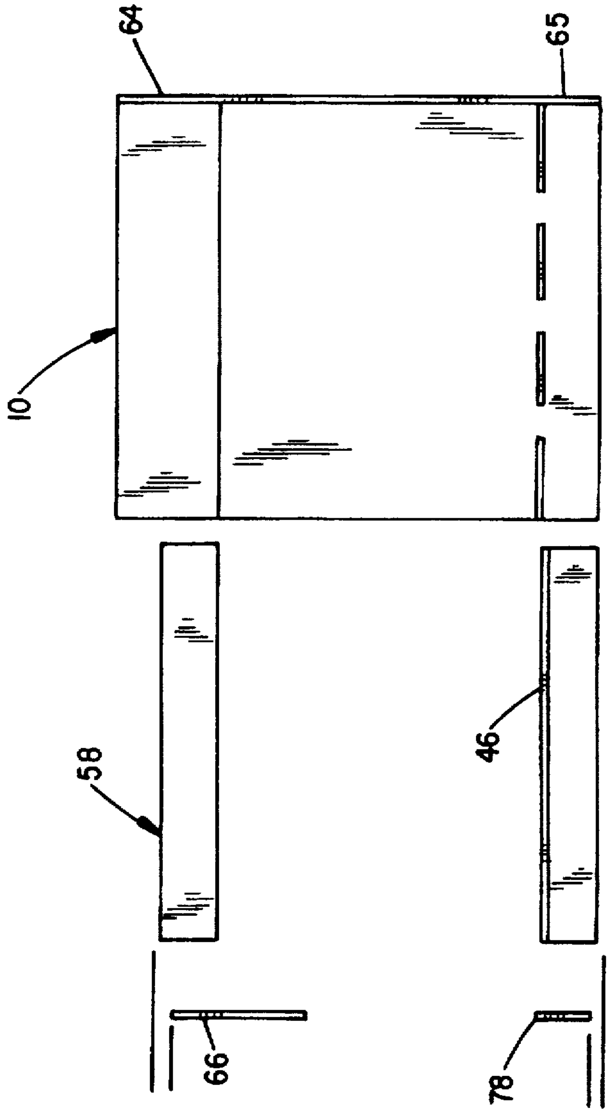
FIG. 3 is a schematic end diagram of the system, including upper and lower wear pads.

The side wall of the hopper includes opposed inwardly projecting stiffener shapes horizontally disposed as along the hopper sides 20 and 22 respectively at 24 and 26. These shapes have angled lower surfaces 28 and 30 directed toward the packer or ejector 10. Spaced parallel bottom rails 32 and 34 are mounted on the hopper floor and extend for the length of the reciprocating stroke of the packer 10. As better appreciated from FIGS. 2 and 3, lower recesses are provided in the packer or ejector structure at 40 and 42 to accommodate the upper cross section of respective elongated wear shoes or lower wear pads 44 and 46, respectively, the lower surfaces of which are recessed or notched along the length of the shoe as at 48 and 50 to accommodate the upper surface of rails 32 and 34. The rails are shown generally in the shape of inverted 90° structural angle pieces that may be of any convenient, readily matchable shape.

Recessed shoulders 52 and 54 flank the packer or ejector upper side corner surfaces and are designed to carry elongate upper wear pads 56 and 58 having outer wear surfaces 60 and 62, respectively, champhered or angled to match the surfaces 28 and 30 of the structural stiffeners 24 and 26. Stop plates as at 64 retain the forward ends of the wear pads 56 and 58 (FIGS. 2 and 3) and retainer plates respectively 63 and 66 retain the rearward ends of the wear pads 56 and 58; retainer plates 63 and 66 are removeably fastened at 68, 70 to packer or ejector 10 as by machine screws 72, 74.

Similarly, the lower wear pad blocks or shoes are retained between forward stops as at 65 (FIG. 3) and rear access plates 76, 78, which likewise attach to the body of the packer or ejector but not the wear shoes as by machine screws 80 and 82. As shown in the figures, note that the stops and access retainer plates do not cover the wear pad section entirely and allow adequate protrusion of the wear shoe or pad surface beyond the stop plate or retainer plate so as not to interfere with the operating low friction surface. In this manner, also, if for some reason the wear shoes or pads are not replaced in time, as metal to metal abrasion occurs, the parts affected are readily replaceable or repairable.

The materials of construction of the wear shoes or wear pads are an important aspect of the invention inasmuch as lower surface friction, longer wearing and lighter weight materials are most desired. Of course, they also must be relatively inert chemically to the materials processed. Accordingly, many high impact, abrasion resistant and self-lubricating polymer materials are advantageous. Such materials, not only offer greater wear resistance over conventional bronze or other metallic surfaces, they are lighter weight and can readily be cast polymerized into the exact shape required for the particular shoe or pad. Examples of these products include a series of modified polyamide, particularly nylon products sold, examples of which are under the trademark "Nylatron" (Polymer Corporation, Reading, Pa.). One such material known as GSM cast nylon can be directly polymerized from the neonomer into the shape of the article desired producing either simple or complex shapes free of voids and in sizes larger than those possible with conventional extrusion. These nylons may also be modified by incorporation or impregnation with friction reducing oils and molybdenum disulfide ($MoS_2$) which improves mechanical thermal and bearing properties of type 6/6 nylon, for example.

Of course, other materials which have the requisite physical properties and lend themselves to manufacture in the desired shapes and sizes can also be used. Another example of such material is polyetheretherketone (PEEK). Modified, partially crystallized polyethylene terephthalate thermoplastic polyester, thermoplastic acetyls and other materials are contemplated. It will further be appreciated that the shoes and pads may be of shapes other than those illustrated and described in the detailed description, which is exemplary rather than limiting in any respect. Also, the wear surface may be applied to or over a diverse base material such as an inert filler or spacer material.

Additionally, different materials may be used for the wear shoes and the upper wear pads where, generally, wear is less severe. Metal pads may be used for the upper pads in some applications and for both the upper pads and lower shoes in others. These include conventional metal materials, such as bronze, brass and steel, for example, that may also be used for the wear surfaces.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a vehicle mounted reciprocating refuse packing or ejecting mechanism designed to operate along and carried by spaced parallel rails:

(a) a vehicle body;

(b) a pair of spaced parallel closed bottom rails having a diverging upper cross section mounted in said vehicle body;

(c) a packer or ejection mechanism designed to be carried by said rails in said body;

(d) a pair of spaced wear shoes disposed between said rails and said mechanism each having a lower recessed shape to conform to the upper cross section of said bottom rails;

(e) a pair of inwardly directed shaped members mounted along in said vehicle body and above the side of said mechanism, said shaped members being parallel to said rails and each having an upper wear surface at least partially directed downward;

(f) a pair of spaced upper wear pads associated with said mechanism, each wear pad having an upper surface matching an adjacent one of said upper wear surfaces; and wherein said wear shoes and said wear pads are free of attachment to said mechanism.

2. The apparatus of claim 1 further comprising retaining means fixed to said mechanism and partially covering the ends of said wear shoes and said upper wear pads restricting the motion thereof relative to said mechanism.

3. The apparatus of claim 2 wherein some of said retaining means are removable plates, the removal of which exposes an end of the respective wear shoe or wear pad for ready removal and exchange thereof.

4. The apparatus of claim 1 wherein said spaced parallel bottom rails are inverted angle shapes and the corresponding wear shoes contain matching bottom cutouts.

5. The apparatus of claim 1 wherein said wear shoes and said upper wear pads are molded from a low friction abrasion resistant, modified polyamide material.

6. The apparatus of claim 1 wherein said mechanism is a packing mechanism designed to cycle continuously during refuse collection.

7. The apparatus of claim 1 wherein said lower wear shoes and said upper wear pads are molded from a light weight relatively lubricious and abrasion resistant polymer material.

8. The apparatus of claim 1 wherein said lower wear shoes and said upper wear pads are of diverse compositions.

9. The apparatus of claim 1 wherein at least one of said lower wear shoes and said upper wear pads are metal.

10. In a vehicle mounted reciprocating refuse packing or ejecting mechanism designed to operate along and carried by spaced parallel rails:

(a) a vehicle body;

(b) a pair of spaced parallel closed bottom rails having a diverging upper cross section mounted in the floor of said vehicle body;

(c) a packer or ejection mechanism designed to be carried by said rails in said body;

(d) a pair of spaced parallel lower recesses in said packer or ejector mechanism configured to accommodate an upper cross section of corresponding wear shoes;

(e) a pair of elongated wear shoes disposed to be partially accommodated in said lower recesses in said mechanism and having lower recesses configured to conform to the upper cross section of said bottom rails so that said mechanism is supported on said wear shoes; and (f) wherein said wear shoes are free to move relative to said mechanism.

11. The apparatus of claim 10 further comprising retaining means fixed to said mechanism and partially covering the ends of said wear shoes restricting the motion thereof relative to said mechanism.

12. The apparatus of claim 11 wherein some of said retaining means are removable plates, the removal of which exposes an end of the respective wear shoe for ready removal and exchange thereof.

13. The apparatus of claim 11 wherein said spaced parallel bottom rails are inverted angle shapes and the corresponding wear shoes contain matching bottom cutouts.

14. The apparatus of claim 11 wherein said wear shoes are molded from a low friction abrasion resistant, modified polyamide material.

15. The apparatus of claim 11 wherein said wear shoes are molded from a light weight relatively lubricious and abrasion resistant polymer material.

16. The apparatus of claim 11 wherein said lower wear shoes are metal.

17. In a vehicle mounted reciprocating refuse packing or ejecting mechanism designed to operate along and carried by spaced parallel rails:

(a) a vehicle body;

(b) a packer or ejection mechanism designed to be carried by rails in said body;

(c) a pair of inwardly directed shaped members mounted along in said vehicle body along side walls thereof and above the side of said mechanism, said shaped members being parallel to said vehicle body and each having an upper wear surface at least partially directed downward; and (d) a pair of spaced wear pads associated with said mechanism, each wear pad having an upper surface matching an adjacent one of said upper wear surfaces;

(e) wherein said wear pads are unattached with respect to said mechanism; and (f) retaining means fixed to said mechanism and partially covering the ends of said upper wear pads restricting the motion thereof relative to said mechanism.

18. The apparatus of claim 17 wherein some of said retaining means are removable plates, the removal of which exposes an end of the respective wear pad for ready removal and exchange thereof.

19. The apparatus of claim 17 wherein said wear pads are molded from a low friction abrasion resistant, modified polyamide material.

20. The apparatus of claim 17 wherein said wear pads are molded from a light weight relatively lubricious and abrasion resistant polymer material.

21. The apparatus of claim 17 wherein said wear pads are metal.

* * * * *